(12) United States Patent
Balsimo et al.

(10) Patent No.: US 6,207,251 B1
(45) Date of Patent: Mar. 27, 2001

(54) REINFORCED PARTICLE-LOADED FIBRILLATED PTFE WEB

(75) Inventors: William V. Balsimo, Afton; Lloyd R. White, Minneapolis, both of MN (US)

(73) Assignee: Minnesota Mining and Manufacturing Company, St. Paul, MN (US)

( * ) Notice: Subject to any disclaimer, the term of this patent is extended or adjusted under 35 U.S.C. 154(b) by 0 days.

(21) Appl. No.: 08/500,230

(22) Filed: Jul. 10, 1995

Related U.S. Application Data

(63) Continuation-in-part of application No. 08/179,313, filed on Jan. 10, 1994, now abandoned.

(51) Int. Cl.$^7$ .................................................. B32B 3/10
(52) U.S. Cl. ...................... 428/138; 428/237; 428/240; 428/241; 428/246; 428/256
(58) Field of Search .................................. 428/138, 237, 428/240, 241, 246, 256

(56) References Cited

U.S. PATENT DOCUMENTS

| | | | |
|---|---|---|---|
| 3,681,146 | * 8/1972 | Baba et al. . | |
| 3,864,124 | 2/1975 | Breton et al. | 75/212 |
| 3,890,417 | 6/1975 | Vallance | 264/49 |
| 3,954,928 | 5/1976 | Omori et al. | 264/51 |
| 4,153,661 | 5/1979 | Ree et al. | 264/120 |
| 4,194,040 | 3/1980 | Breton et al. | 428/308 |
| 4,373,519 | 2/1983 | Errede et al. | 128/156 |
| 4,460,642 | 7/1984 | Errede et al. | 428/283 |
| 4,491,553 | * 1/1985 | Yamade et al. | 264/51 |
| 4,500,647 | * 2/1985 | Solomon | 502/101 |
| 4,565,663 | 1/1986 | Errede et al. | 264/120 |
| 4,645,602 | 2/1987 | Barnes, Jr. et al. | 210/490 |
| 4,722,898 | 2/1988 | Errede et al. | 435/182 |
| 4,810,381 | 3/1989 | Hagen et al. | 210/502 |
| 4,871,671 | 10/1989 | Errede et al. | 435/182 |
| 4,906,378 | 3/1990 | Hagen et al. | 210/635 |
| 4,971,697 | 11/1990 | Douden et al. | 210/502 |
| 4,971,736 | 11/1990 | Hagen et al. | 264/22 |
| 4,983,434 | 1/1991 | Sassa | 428/36 |
| 5,009,971 | 4/1991 | Johnson et al. | 429/252 |
| 5,019,232 | 5/1991 | Wilson et al. | 204/182 |
| 5,037,457 | 8/1991 | Goldsmith et al. | 55/158 |
| 5,071,610 | 12/1991 | Hagen et al. | 264/120 |
| 5,100,724 | 3/1992 | LaMarca, II et al. | 428/300 |
| 5,139,841 | 8/1992 | Makoui et al. | 428/109 |
| 5,147,539 | 9/1992 | Hagen et al. | 210/198 |
| 5,209,967 | 5/1993 | Wright et al. | 428/283 |
| 5,229,198 | * 7/1993 | Schroeder | 428/256 |
| 5,230,800 | 7/1993 | Nelson | 210/496 |
| 5,238,621 | 8/1993 | Hagen et al. | 264/45 |
| 5,248,428 | 9/1993 | Hagen et al. | 210/656 |
| 5,279,742 | 1/1994 | Markell et al. | 210/638 |

FOREIGN PATENT DOCUMENTS 993193   5/1965   (GB) .

OTHER PUBLICATIONS

Hogan, "Particulates Captured/Carried by Fibrillated PTFE," *Design News*, Feb. 9, 1987 (Cahners Publishing Company).

Hagen et al., "Membrane Approach to Solid Phase Extractions," *Analytica Chimica Acta*, 236, 157–64 (1990) no month given.

L.A. Errede, "Polymer Swelling 2: A Restudy of Poly(Styrene–co–Divinylbenzene) Swelling in Terms of the Cross–link Density," *Journal of Applied Polymer Science*, 31, 1749–61 (1961) no month given.

L.A. Errede et al., "Reactive Microporous Composite Membranes," *Chemically Modified Surfaces*, vol. 2, pp. 91–104 (1987) no month given.

\* cited by examiner

Primary Examiner—Mark D. Sweet
(74) Attorney, Agent, or Firm—Gary L. Griswold; Walter N. Kirn; David G. Burleson

(57) ABSTRACT

A composite article including a particle-loaded fibrillated polytetrafluoroethylene web with a reinforcing screen or scrim partially embedded therein.

5 Claims, 4 Drawing Sheets

REINFORCED PARTICLE-LOADED FIBRILLATED PTFE WEB

This is a continuation-in-part application of U.S. Ser. No. 08/179,313 filed Jan. 10, 1994 now abandoned.

BACKGROUND OF THE INVENTION

A. Field of the Invention

This invention describes a particle-loaded fibrillated polytetrafluoroethylene web with a reinforcing screen or scrim at least partially embedded therein. Compared to an unreinforced web, this reinforced web can resist a much greater pressure drop across it without deforming and displays greater strength against various mechanical stresses.

B. Description of Related Art

Particle-loaded, non-woven, fibrous articles wherein the non-woven fibrous web can be compressed, fused, melt-extruded, air-laid, spunbonded, mechanically pressed, or derived from phase separation processes have been disclosed as useful in separation science. Web products of non-woven webs having dispersed therein sorbent particulate have been disclosed to be useful as, for example, respirators, protective garments, fluid-retaining articles, wipes for oil and/or water, and chromatographic and separation articles. Coated, inorganic oxide particles have also been enmeshed in such webs. Such webs with enmeshed particles which are covalently reactive with ligands (including biologically-active materials) have also been recently developed.

Numerous examples of PTFE filled with or entrapping particulate material are known in many fields. Many applications for PTFE filled with electroconductive materials are known. These include circuit boards, oil leak sensors, electrical insulators, semipermeable webs, and various types of electrodes. Other such combinations have been used as gasket or sealing materials and wet friction materials. Still others have been used to produce high-strength PTFE films and webs with applications as structural elements and electronic components. Where the particulate has catalytic properties, this type of combination provides a form which can be conveniently handled. U.S. Pat. No. 4,153,661 discloses various particulate distributed in a matrix of entangled PTFE fibrils as being useful in, among other things, electronic insulators and semipermeable webs.

Numerous combinations of PTFE and metals in which the metal is not entrapped within a PTFE matrix are also known. These include PTFE webs completely or partially coated with metal and metal matrices with a network of fibrillated PTFE in the pores thereof. PTFE powder with metal filler has been used (in paste form) as a battery electrode and as a self-lubricating layer coated on bronze bearings. PTFE films coated onto metal films and plates are also known.

Methods of preparing fibrillated PTFE webs have been described in, for example, U.S. Pat. Nos. 4,153,661, 4,460,642, and 5,071,610.

The physical properties of such particle-loaded fibrillated PTFE webs are somewhat limited, however. They do not resist high pressure drops without deforming and have limited strength against mechanical stresses created by, for example, fluid flow, tensile force, mechanical impact, and abrasion.

SUMMARY OF THE INVENTION

In one aspect, the present invention provides a composite article, preferably a separation science medium, comprising a fibrillated polytetrafluoroethylene (PTFE) web having particulate entrapped therein and, at least partially embedded in the web, means for reinforcing the web. Preferably, this reinforcing means is a screen or scrim. The web, the reinforcing means, and the overall article are all liquid permeable.

In another aspect, the present invention provides a method for making this article comprising the steps of providing a fibrillated PTFE web with particulate entapped therein and pressure bonding to the web a means for reinforcing the web so that the reinforcing means is at least partially embedded in the web.

Unless otherwise indicated, the following definitions apply in this application:

"screen" means a reinforcing material with a regular geometric pattern of threads which can be polymeric, glass, metallic, etc.;

"scrim" means a non-woven web the fibers of which are not in a regular geometric pattern and which can be polymeric, glass, metallic, etc.; and "partially embedded" (when used in connection with a reinforcing means) means the reinforcing means is (a) at least partially depressed in the web to which it has been pressure bonded so that the reinforced web, when viewed from an edge, shows only up to 95%, preferably up to 90%, more preferably up to 75%, and most preferably up to 50%, of the reinforcing means and (b) at least partially mechanically entangled with the web.

Embedding a reinforcing means in a fibrillated PTFE web provides the web with mechanical strength and resistance to deformation when a pressure drop is applied across it. Use of such a reinforcing means also allows the web to be formed into configurations that were previously difficult, if not impossible to achieve. For example, such reinforced webs can be pleated, whereas unreinforced webs suffer catastrophic damage when pleating is attempted.

The reinforcing means used in the composite article of the present invention is at least somewhat porous, preferably very porous (i.e., at least 50% voids), so as not to greatly interfere with the porosity of the fibrillated PTFE web. This reinforcing means is at least partially embedded in the fibrillated PTFE web. The PTFE fibrils appear to actually attach to or become mechanically entangled with the reinforcing means. This is further illustrated by reference to the drawings described below.

DETAILED DESCRIPTION OF PREFERRED EMBODIMENTS

Figure 1:
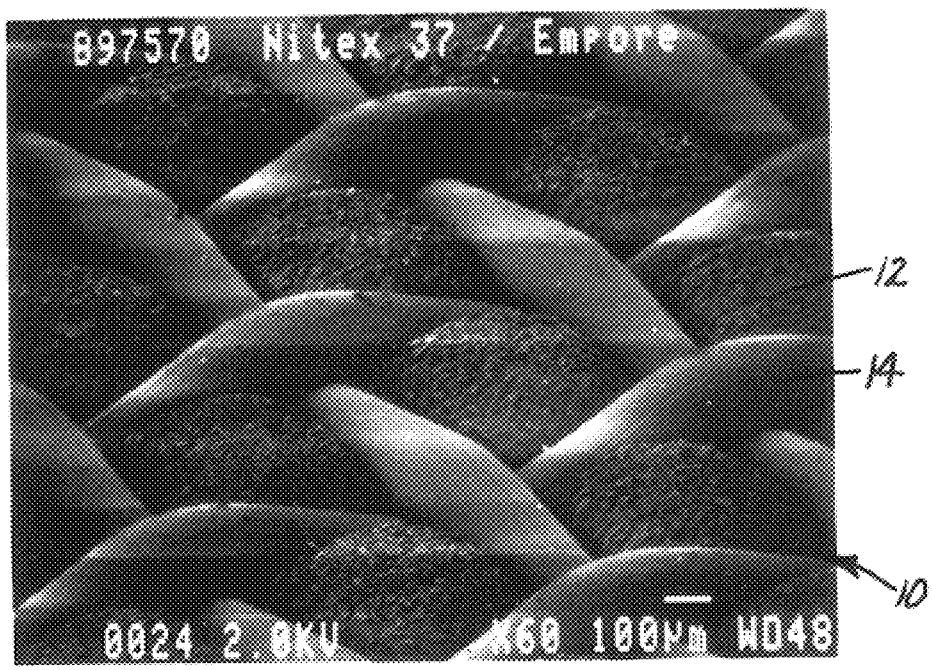
FIG. 1 is a scanning electron micrograph (SEM) of a fibrillated PTFE web reinforced with a polymeric screen.

FIG. 1 shows an SEM (60× magnification) of reinforced web 10 comprising particle-loaded fibrillated PTFE web 12 with screen 14 partially embedded therein. In this particular embodiment, fibrillated PTFE web 12 entraps activated carbon particulate. Any particulate, regardless of shape, that can be entrapped in a nonwoven polymeric web can be used in the reinforced fibrillated PTFE web of the present invention. Representative examples of useful particulate include those listed in U.S. Pat. Nos. 4,153,661, 4,460,642, 5,071,610, and 5,209,967 as well as U.S. Ser. No. 08/004,967, which lists are herein incorporated by reference. Particularly useful particulate materials include activated carbon, silica, derivatized silica, glass beads and bubbles, chitin, and the like. In this particular embodiment, screen 14 is Nitex™ 37 nylon (TETKO, Inc.; Rolling Meadows, Ill.). Any porous screen can be used as a reinforcement means, although those with a very fine mesh can interfere with the porosity of the web and cause undesirable resistance to flow and channeling. Screen 14 can be pressed into web 12 by standard pressure bonding techniques as are well known in the art, optionally under elevated temperature.

Figure 2:
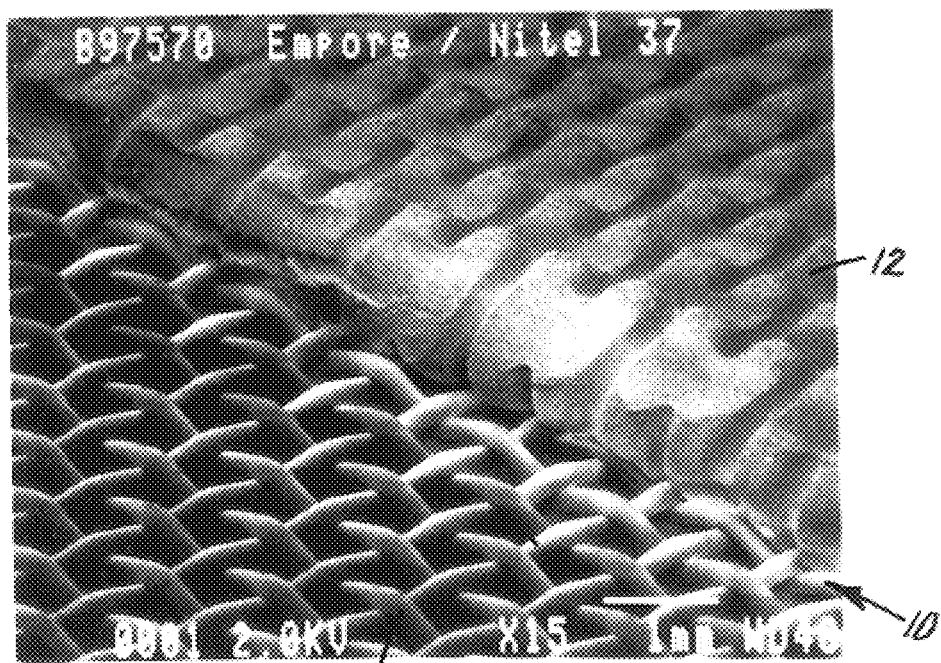
FIG. 2 is an SEM of the reinforced web from FIG. 1 with the screen partially pulled away from the web.

FIG. 2 shows an SEM (15× magnification) of fibrillated PTFE web 12 with screen 14 partially pulled away therefrom. The screen ppattern can be seen clearly in web 12.

Figure 3:
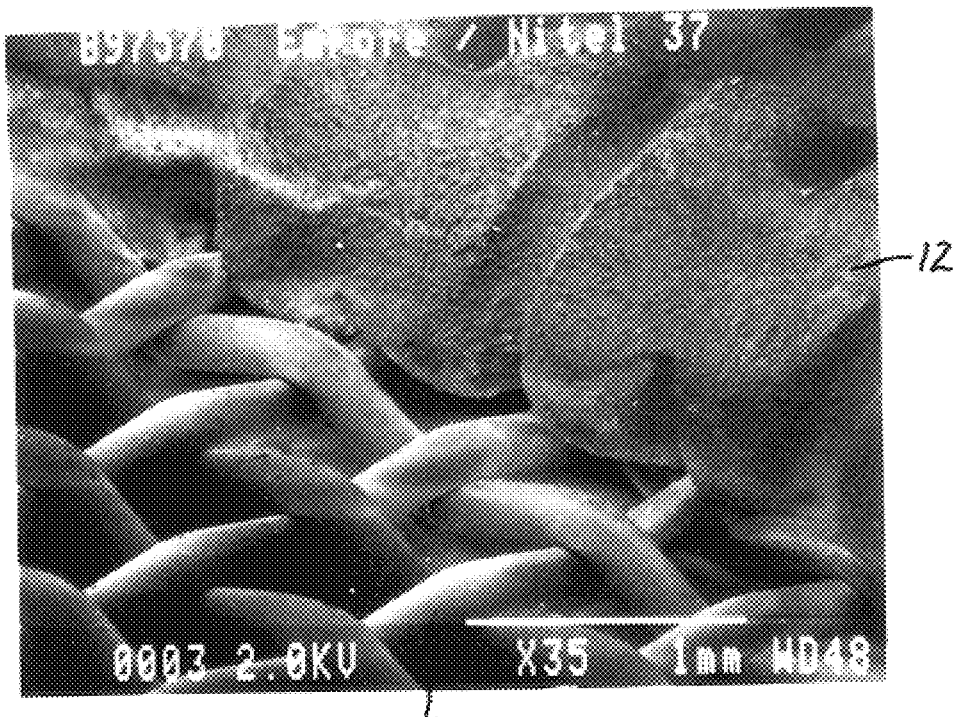
FIG. 3 is an SEM providing a more magnified view of the reinforced web from FIG. 2.

FIG. 3 shows a more magnified close-up SEM (35× magnification) of that seen in FIG. 2. Again, the pattern of screen 14 can be seen clearly in web 12.

Figure 4:
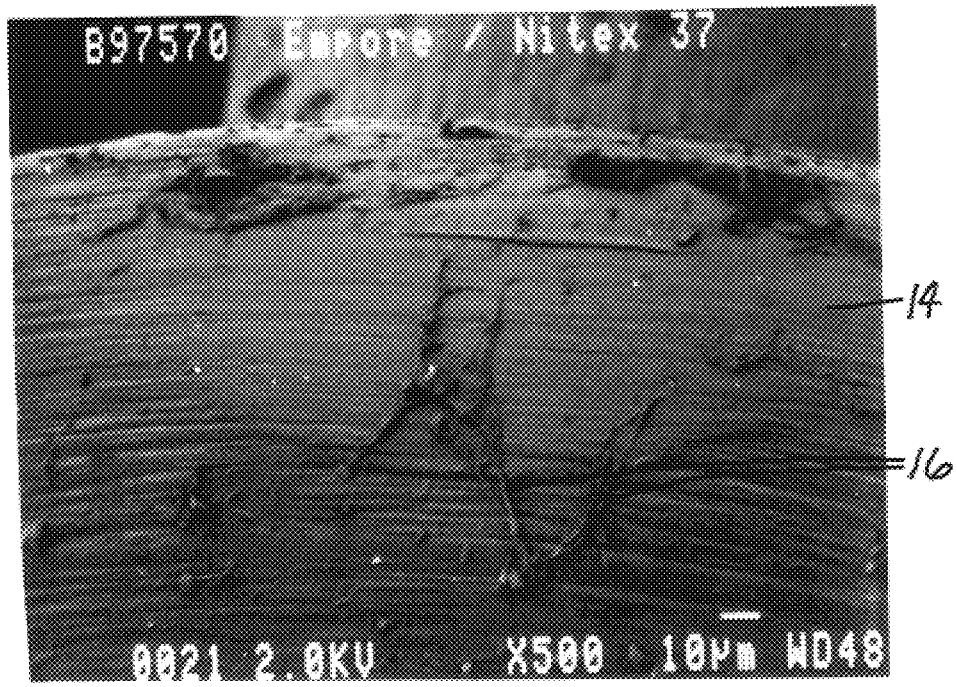
FIG. 4 is an SEM of one screen thread of the reinforced web from FIG. 3.

FIG. 4 shows an SEM (500× magnification) of PTFE fibrils 16 from web 12 (of FIGS. 1–3) still attached to screen 14 after screen 14 has been partially pulled away from web 12. That fibrils 16 become mechanically entangled with or attached to screen 14 threads while screen 14 is embedded in web 12 is readily apparent.

Figure 5:
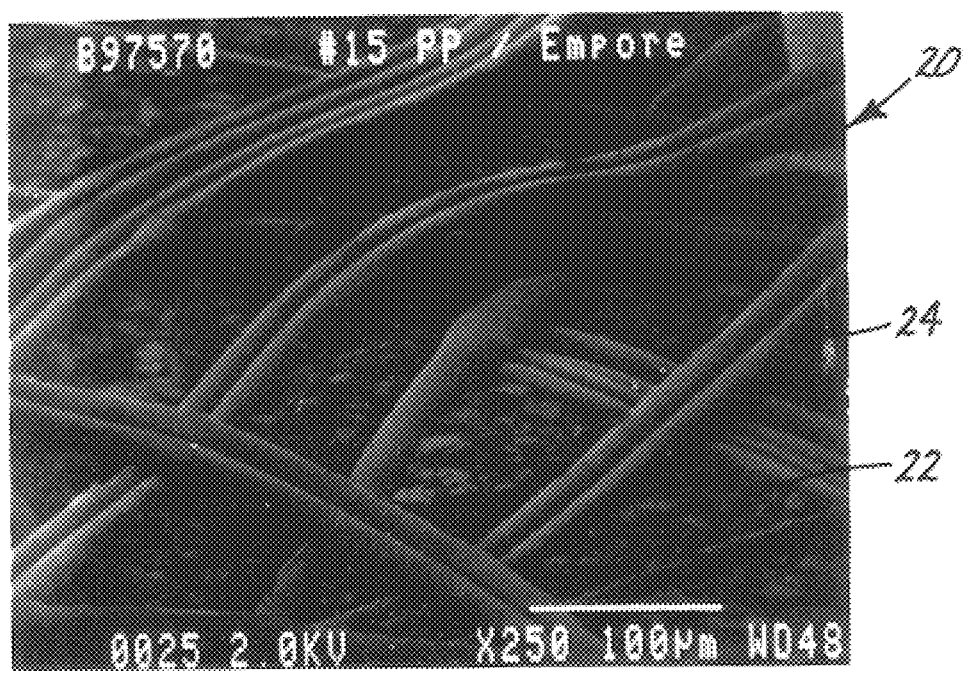
FIG. 5 is an SEM of a fibrillated PTFE web reinforced with a polymeric scrim.

FIG. 5 shows an SEM (250× magnification) of reinforced web 20 comprising particle-loaded fibrillated PTFE web 22 with scrim 24 partially embedded therein. In this embodiment, fibrillated PTFE web 22 entraps silica, although, as mentioned above, many other types of particulate can be used. In this embodiment, scrim 24 is a nonwoven polypropylene web available from, for example, AMOCO Fabrics & Fibers Co. (Atlanta, Ga.). Any porous scrim can be used as a reinforcement means, however.

Figure 6:
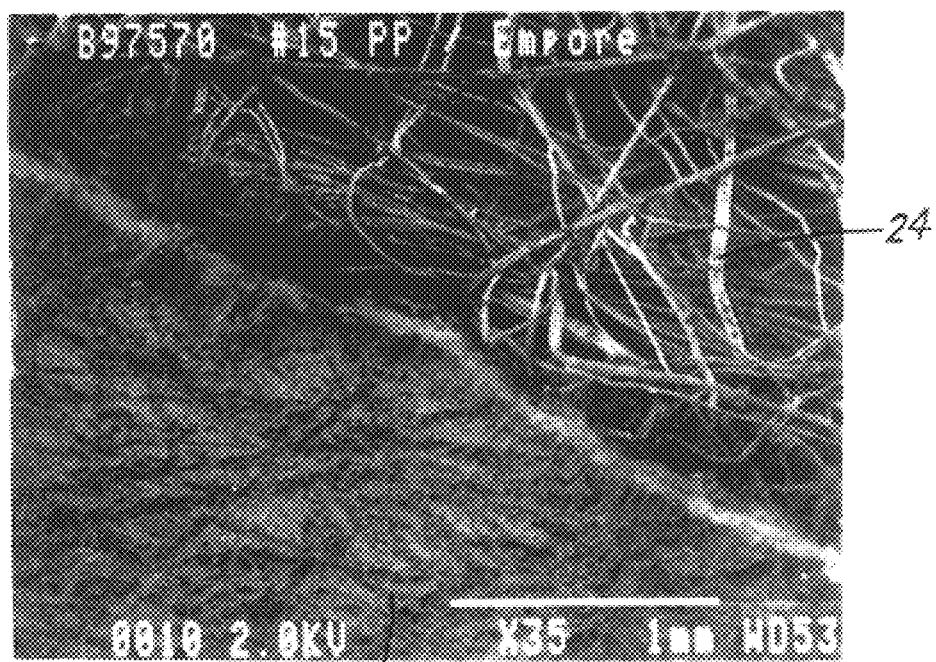
FIG. 6 is an SEM of the reinforced web from FIG. 5 with the scrim partially pulled away from the web.

FIG. 6 shows an SEM (35× magnification) of fibrillated PTFE web 22 with scrim 24 partially pulled away therefrom. The scrim pattern can be seen clearly in web 22.

Figure 7:
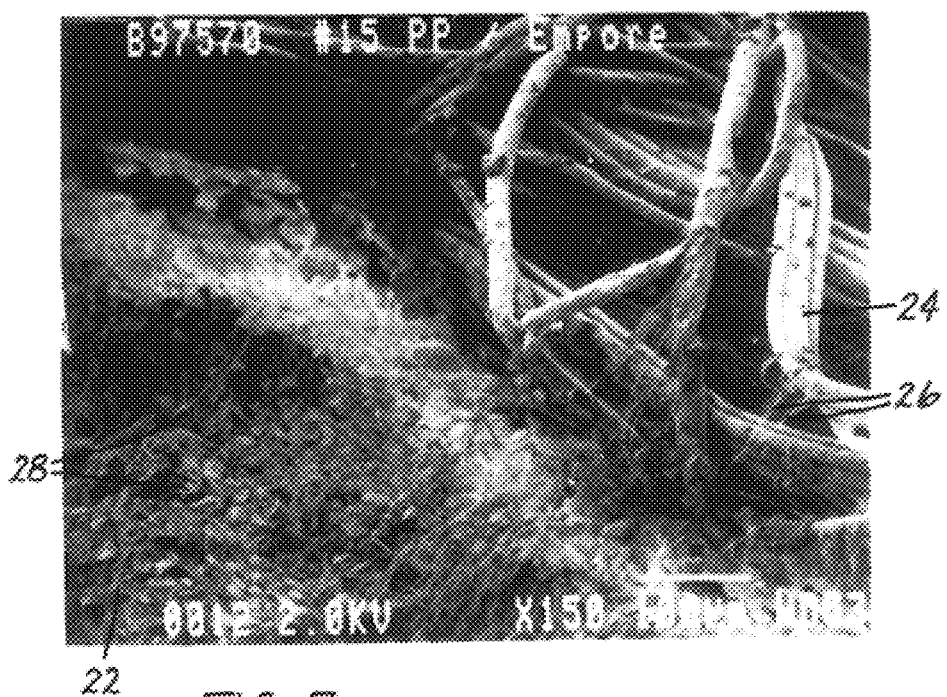
FIG. 7 is an SEM providing a more magnified view of the reinforced web from FIG. 6.

FIG. 7 shows a more magnified close-up SEM (150× magnification) of that seen in FIG. 6. PTFE fibrils 26 can be seen being pulled away from web 22 as scrim 24 is removed therefrom.

Figure 8:
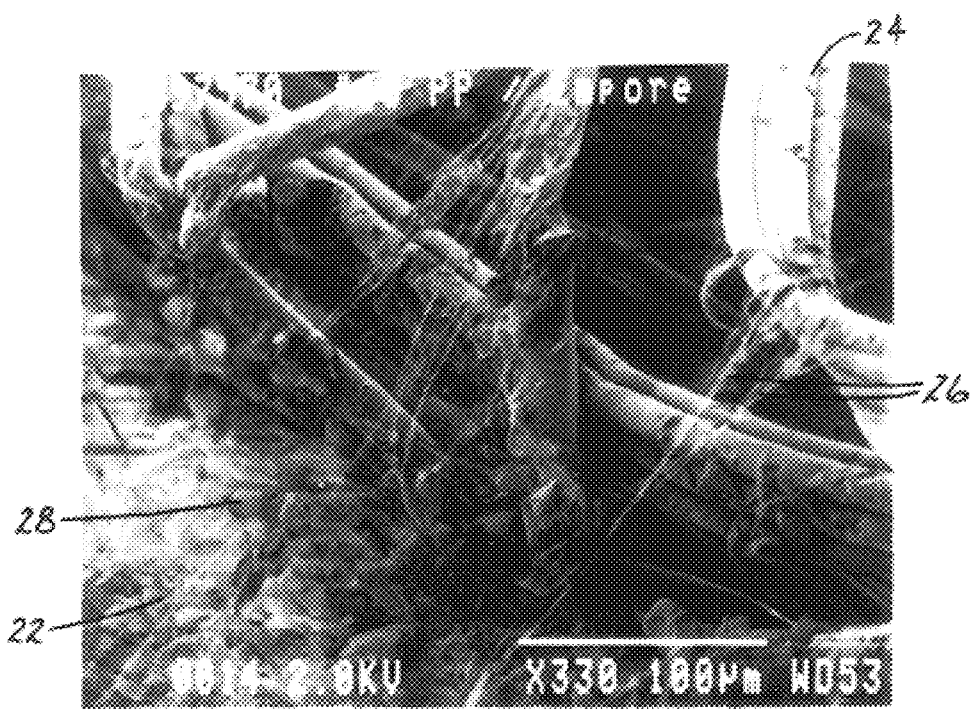
FIG. 8 is an SEM of one scrim fiber of the reinforced web from FIG. 7.

FIG. 8 shows a more magnified close-up SEM (330× magnification) of that seen in FIG. 7. Silica particles 28 entrapped within fibrils 26 are apparent. Once again, that fibrils 26 become mechanically entangled with or attached to scrim 24 fibers while scrim 24 is embedded in web 22 is readily apparent.

Suprisingly, we have found that non-woven scrims provide a better reinforcing means for fibrillated PTFE webs when such webs are to be used as separation science media. This is believed to be true because a scrim, unlike a screen, does not provide convenient and regular paths for channelling. Also, a scrim does not imbed itself as deeply into the fibrillated PTFE web as does a screen. Accordingly, the vast majority of the web is below the exterior surface of the scrim. Such a scrim-protected web has been observed to pleat without sticking to the pleater and, accordingly, does not tear as easily as does a screen-protected web.

To make the web in which are entrapped the active particulate, one begins with an aqueous PTFE dispersion. This milky-white dispersion contains about 20% to 70% (by weight) of minute PTFE particles suspended in water. A major portion of these PTFE particles range in size from 0.05 to about 0.5 μm. Commercially available aqueous PTFE dispersions may contain other ingredients such as surfactants and stabilizers that promote continued suspension. Examples of such commercially available dispersions include Teflon™ 30, Teflon™ 30B, and Teflon™ 42 (DuPont de Nemours Chemical Corp.; Wilmington, Del.). Teflon™ 30 and Teflon™ 30B contain about 59% to 61% (by weight) PTFE solids and about 5.5% to 6.5% (by weight, based on the weight of PTFE resin) of a non-ionic wetting agent, typically octylphenyl polyoxyethylene or nonylphenyl polyoxyethylene. Teflon™ 42 contains about 32% to 35% (by weight) PTFE solids and no wetting agent (but does contain a surface layer of organic solvent to prevent evaporation).

The particle-loaded fibrillated PTFE web preferably is prepared as described in any of U.S. Pat. Nos. 4,153,661, 4,460,642, and 5,071,610, the processes of which are incorporated herein by reference, by blending the desired reactive particulate into the aqueous PTFE emulsion in the presence of sufficient lubricant to approach or, preferably, exceed the sorptive capacity of the solids yet maintain a putty-like consistency. This putty-like mass is then subjected to intensive mixing at a temperature preferably between 40° and 100° C. to cause initial fibrillation of the PTFE particles. The resulting putty-like mass is then repeatedly and biaxially calendered, with a progressive narrowing of the gap between the rollers (while at least maintaining the water content), until the shear causes the PTFE to fibrillate and enmesh the particulate and a layer of desired thickness is obtained. Removal of any residual surfactant or wetting agent by organic solvent extraction or by washing with water after formation of the web article is generally desirable. The resultant web is then dried. Such webs preferably have thicknesses in the range of 0.1 to 0.5 mm. Web articles with a thickness in the general range of 0.05 to 10 mm can be useful.

If a web article with multiple particulate layers is desired, the component layers themselves are stacked on each other and calendered until they form a composite where the PTFE fibrils of the separate layers are entwined at the interface of adjacent webs. Such multilayer webs demonstrate little boundary mixing between adjacent layers of particles. Multilayer articles preferably have thicknesses in the range of 0.1 to 10 mm.

The void size and volume within such a web article can be controlled by regulating the lubricant level during fabrication as described in U.S. Pat. No. 5,071,610, the teaching of which is incorporated herein by reference. Because both the size and the volume of the voids can vary directly with the amount of lubricant present during the fibrillation process, webs capable of entrapping particles of various sizes are possible. For instance, increasing the amount of lubricant to the point where it exceeds the lubricant sorptive capacity of the particulate by at least 3% (by weight) and up to 200% (by weight) can provide mean void sizes in the range of 0.3 μm to 5.0 μm with at least 90% of the voids having a size of less than 3.6 μm. This process can be used to create a web article with one or more kinds of reactive particulate enmeshed therein. The PTFE which forms the web within which particulate is to be trapped can be obtained in resin emulsion form wherein the PTFE and lubricant are already pre-mixed (e.g., Teflon™ 30 or 30B, DuPont de Nemours; Wilmington, Del.). To this emulsion can be added additional lubricant in the form of water, water-based solvents such as a water-alcohol solution, or easily-removable organic solvents such as ketones, esters, and ethers, to obtain the aforementioned desired proportion of lubricant and particulate.

Active particulate (i.e., those which perform a funtion such as chemical reaction with or sorption of a solute or conduction) useful in the present invention includes any such particulate that can be immobilized in a non-woven, fibrous matrix. Representative sorptive particles include, but are not limited to, activated carbon, silica, derivatized silica, ion exchange resins, intercalated styrene divinylbenzene, and chitin. Conductive particles such as silver-coated glass spheres can also be used. Particulate material can be of regular (flat, spherical, cubic, rod- or fiber-like, etc.) or irregular shape. Average diameters of useful particles are within the range of 0.1 to 100 $\mu$m, more preferably within the range of 0.1 to 50 $\mu$m, and most preferably within the range of 1 to 10 $\mu$m. Such particulate can be incorporated directly into the web article.

Particulate is generally distributed uniformly in the web article, but matrices which include combinations of particulate can be prepared. Alternatively, layers containing different particulate can be calendered into a single matrix with distinct strata of particulate. Such multilayer composite articles show minimal boundary mixing (between the various particulate) and retain good uniformity throughout each layer. Whether in a heterogeneous or homogenous form, this type of article can selectively sorb or react with one or more chemical species to be removed from a fluid where these webs are to be used in chromatographic or separations applications.

Total particulate content of the web article can range up to about 97% (by weight), (although particulate amounts in the range of 80 to 95% (by weight) tend to produce more stable web articles). The enmeshing fibrils retain the enmeshed particulate, by entrapment or adhesion, within the matrix, and the enmeshed particles resist sloughing.

The web article of the present invention preferably comprises active particulate in an amount of at least 10% (by weight), more preferably comprises active particulate in an amount of at least 50% (by weight), and most preferably comprises active particulate in an amount of at least 80% (by weight). High active particulate loading is desirable to maximize the sorptive capacity or chemical activity of the substrate.

Non-active adjuvant particles with average diameters in the same ranges as listed previously with respect to active particulate can be included. Representative examples of useful adjuvants that can be incorporated in the web article include property modifiers such as glass beads and/or bubbles, glass particles other than beads or bubbles, energy-expandable hollow polymeric particles such as Expancel™ microspheres (Nobel Industries; Sundsvall, Sweden) and mica. When present, such non-active particulate can comprise from more than 0 to 95% (by weight), preferably from more than 0 to 50% (by weight), and most preferably from more than 0 to 10% (by weight) of the web article.

Particle-loaded fibrillated PTFE webs that have been reinforced in the above manner display improved resistance to ballooning and/or tearing and to shrinkage. This is very desirable in applications where the web must withstand a pressure drop caused by fluid flowing through it or must display dimensional stability. (Unreinforced fibrillated PTFE webs tend to shrink in the direction in which they were last machined.) Also, reinforced webs are easier to handle and less likely to be damaged during normal use.

If desired, a fibrillated PTFE web with particulate entrapped therein can also be reinforced on both sides. In other words, reinforcement means can be partially embedded in both sides of the web. This can increase the composite article's resistance to the aforementioned undesirable properties. Additionally, multilayer web-reinforcing means composite articles also can be made. This might be desirable where each web layer contains a different type of particulate.

The reinforced particle-loaded fibrillated PTFE webs of the present invention can be used wherever unreinforced particle-loaded fibrillated PTFE webs are useful, particularly in separation science (e.g., chromatographic and other separations as well as extractions). They are especially useful where such webs are to be pleated, as described in assignee's copending U.S. Ser. No. 08/179,118.

Objects and advantages of this invention are further illustrated by the following examples. The particular materials and amounts thereof, as well as other conditions and details, recited in these examples should not be used to unduly limit this invention.

EXAMPLES

Example 1

The particle-loaded fibrillated PTFE web described herein was made essentially according to the procedure described in columns 3 to 6 of U.S. Pat. No. 4,153,661.

The following materials were added together and the mixture was mixed in a Ross™ mixer (Charles Ross & Son Co.; Hauppage, N.Y.) at 30 rpm for 45 sec at 38° C.:

400 g dry super-activated carbon with a surface area of 2000 to 3000 $m^2/g$ and an average particle size of 30 $\mu$m with a range of 3.9 to 200 $\mu$m (Kansai Coke and Chemicals Co. Ltd.; Amagasaki City, Japan)

312 g FLUON™ PTFE emulsion, 22.6% PTFE in water (ICI Americas, Inc.; Wilmington, Del.)

894 g deionized water

This mixing provided a doughy mass.

This dough-like mass was passed through a two-roll mill with an initial gap setting of 3.81 mm. The first few passes resulted in a web without enough strength to support its own weight; however, after a few more passes, the web was strong enough to maintain its integrity so that it could be folded into three layers and rotated 90° for its next pass through the mill. This biaxial calendering was followed for a total of ten passes. Thereafter, the gap was adjusted from 2.54 mm to 1.27 mm to 0.64 mm (with web passes through each gap) to produce a long web.

After the above three passes, the web was folded into eight layers and rotated 90°. The gap was adjusted from 2.54 mm to 1.90 mm to 1.27 mm to 0.76 mm (with web passes through each gap). This process yielded a fibrillated PTFE web that was 1.14 mm thick which was dried by passing through a belt oven.

This web was reinforced by placing it between two layers of Naltex™ LWS filtration netting (Nalle Plastics, Inc.; Austin, Tex.) and passing this composite article through a two-roll mill (gap=0.89 mm, roll speed=7.6 cm/sec). The tensile strength of the web-netting bond, measured by pulling the netting away from the web in a tensile tester (Thwing-Albert Instrument Co.; Philadelphia, Pa.), was 0.18 N/cm.

Example 2

A particle-loaded PTFE web was prepared as in Example 1 with the exception that final web thickness was 0.76 mm.

This web was reinforced as in Example 1 with the exception that gap width during reinforcement was 0.51 mm. The tensile strength of this web-netting bond was 0.33 N/cm.

Example 3

A particle-loaded PTFE web was prepared as in Example 1 with the exception that final web thickness was 1.52 mm. This web was reinforced as in Example 1 with the exception that gap width during reinforcement was 1.14 mm. The tensile strength of this web-netting bond was 0.21 N/cm.

Example 4

A particle-loaded PTFE web was prepared as in Example 1 except that extra calendering produced a final web thickness of 0.38 mm. This web was sandwiched between two layers of 25 g/m² basis weight polyethylene non-woven web, and this composite article was passed through a two-roll mill with a gap of 0.25 mm. The tensile strength of this web-non-woven web bond was 0.035 N/cm.

Example 5

A particle-loaded reinforced PTFE web was prepared as in Example 4 except that a polyester non-woven web with a basis weight of 45 g/m² was used. The tensile strength of this web-non-woven web bond was 0.14 N/cm.

Example 6

A particle-loaded reinforced PTFE web was prepared as in Example 5 except that only one layer of reinforcement was used and the gap thickness during calendering was 0.64 mm.

This reinforced web and a similar unreinforced web were evaluated three ways: 1) use as an absorbing means on a generic base, 2) tensile strength, and 3) shrinkage.

Use with a generic base: Generic bases for in-line filter holders are those designed for paper or paper-like webs. They are available from a wide variety of commercial sources such as Gelman Co. (Ann Arbor, Mich.) and Nalgene Co. (Rochester, N.Y.). Unreinforced webs were soft and conformed to the contours of the generic bases. Thus, when a blue food coloring solution was passed through an unreinforced web, flow was restricted to those areas where the web was not in direct contact with the base, and the dye was absorbed only in those areas (i.e., channeling occurred). When a similar dye solution was passed through a reinforced web supported on a generic base, no such conformation was observed, and the dye solution was evenly distributed throughout the web (i.e., channeling, leaks, and/or breakthrough were not observed).

Tensile strength: The tensile strength of the reinforced webs were at least an order of magnitude greater. The tensile strength of various reinforced webs is shown in Table I below.

Shrinkage: Shrinkage induced by mechanical stimulation and by long-term exposure to heat were both tested.

Disks (with diameters of 47 mm) of reinforced and unreinforced webs were biaxially shaken on a sieve shaker (C. E. Tyler Co.; Mentor, Ohio) for approximately 60 minutes. The unreinforced disks shrunk into an elliptical shape with a minor axis of about 42 mm (i.e., about 10% shrinkage). Essentially no shrinkage of the reinforced disks was observed.

Two disks (47 mm diameters) of reinforced web were placed in an oven at 71° C. for 51 days. No shrinkage was observed. Under similar conditions, unreinforced webs would have shrunk by at least 10%.

Example 7

A particle-loaded fibrillated PTFE web was prepared using the same procedure as that described in Example 1. Instead of activated carbon, however, the particulate was a $C_{18}$-derivatized silica (J. T. Baker Co.; Phillipsburg, N.J.). The final thickness of the web was 0.51 mm. The web was 90% (by weight) particulate.

A layer of Naltex™ LWS filtration netting was placed between two of these webs. The layered composite was passed through a two-roll mill (gap=1.27 mm).

A 50 mm×50 mm square sample of this reinforced web was placed in a 47 mm manifold vacuum system (Millipore Corp.; Bedford, Mass.) with the supporting screen removed therefrom. A liter of water with one drop of blue food coloring was pulled through the reinforced web. While removing dye from the solution, the reinforced web did not balloon or tear and was not pulled into the vacuum flask.

Example 8

A large web with $C_{18}$ as the entrapped particulate was prepared using the same procedure as in Example 1. Portions of this web were reinforced with various reinforcing materials, and these reinforced webs were tested against a comparative unreinforced web. The results are summarized in Table I below.

NITEX™ nylon screens are made by TETKO, Inc. (Rolling Meadows, Ill.). Monodur™ Nylon 475 and 850 screens are made by Industrial Fabrics Corp. (Minneapolis, Minn.). Naltex™ filtration netting is made by Nalle Plastics, Inc. (Austin, Tex.). Celestra™ and PBN II™ non-woven webs are made by Fiberweb Inc. (Pensacola, Fla.). Brookings™ non-woven webs are made by Minnesota Mining and Manufacturing Co. (St. Paul, Minn.). Typar™ and 4dpf™ Straight non-woven webs are made by Reemay, Inc. (Old Hickory, Tenn.). Coverstock™ non-woven webs are made by Bonar Fabrics (Greenville, S.C.). RFX™ non-woven webs are made by AMOCO Fibers and Fabrics, Inc. (Atlanta, Ga.).

TABLE I

| Type of Reinforcing means | Sample No. | Tradename of Reinforcing Means | Average basis wt. (g/m²) | Threads per inch | Thread diameter (mils) | Average Failure Stress (lbs. per linear inch width of material) | | Average Failure Strain (% linear increase in length at peak stress) | |
|---|---|---|---|---|---|---|---|---|---|
| | | | | | | Crossweb | Downweb | Crossweb | Downweb |
| NONE | 1 | N/A | 323.7 | N/A | N/A | 0.034 | 0.22 | 378.9 | 34.3 |
| SCREEN | 2 | NITEX ™ nylon | 143.5 | 21 | 10 | 787 | 847 | 30 | 32 |
| | 3 | Monodur ™ Nylon 475 | 116.3 | 37 | 7 | 973 | 786 | 28 | 46 |
| | 4 | Monodur ™ Nylon 850 | 153.6 | 22 | 12 | 866 | 783 | 28 | 29 |
| | 5 | Naltex ™ filtration netting | 53.6 | 15 | N/A | 3.11 | 1.64 | 193.9 | 24.0 |
| | 6 | Naltex ™ filtration netting | 166.3 | 44 | N/A | 11.63 | 13.97 | 168.0 | 44.0 |

TABLE I-continued

| Type of Reinforcing means | Sample No. | Tradename of Reinforcing Means | Average basis wt. (g/m²) | Threads per inch | Thread diameter (mils) | Average Failure Stress (lbs. per linear inch width of material) | | Average Failure Strain (% linear increase in length at peak stress) | |
|---|---|---|---|---|---|---|---|---|---|
| | | | | | | Crossweb | Downweb | Crossweb | Downweb |
| SCRIM | 7 | Celestia ™ non-woven web | 19.2 | N/A | N/A | 1.49 | 4.92 | 27.4 | 36.0 |
| | 8 | Brookings non-woven web | 26.3 | N/A | N/A | 1.25 | 5.92 | 34.9 | 24.6 |
| | 9 | Typar ™ non-woven web | 44.9 | N/A | N/A | 9.01 | 13.18 | 23.8 | 28.0 |
| | 10 | Fiberweb PBN II ™ non-woven web | 10.2 | N/A | N/A | 1.94 | 4.34 | 46.9 | 50.3 |
| | 11 | Bonar Coverstock ™ non-woven web | 17.9 | N/A | N/A | 11.83 | 2.46 | 23.4 | 43.4 |
| | 12 | Cerex ™ non-woven web | 50.9 | N/A | N/A | 2.61 | 3.95 | 59.4 | 40.6 |
| | 13 | AMOCO RFX ™ non-woven web with AS | 16.0 | N/A | N/A | 0.66 | 1.35 | 259.4 | 27.4 |
| | 14 | Reemay 4dpf ™ Straight non-woven web | 23.7 | N/A | N/A | 3.78 | 5.68 | 29.1 | 38.3 |
| | 15 | AMOCO RFX ™ non-woven web | 17.0 | N/A | N/A | 1.54 | 3.53 | 153.7 | 61.1 |
| | 16 | AMOCO RFX ™ non-woven web | 33.9 | N/A | N/A | 2.83 | 7.82 | 182.3 | 79.4 |

N/A—Not applicable

All samples other than No. 1 were reinforced. Stress and strain values for reinforcement means only are not shown but are of the same order of magnitude as for the corresponding reinforced webs.

Because samples 2–4 were improperly cut, their stress and strain values could be off by up to 30%; however, these numbers help to prove the overall conclusion that can be drawn from Table I, i.e., that reinforced webs, regardless of the type of reinforcement, are at least an order of magnitude stronger in both the crossweb and downweb directions than an otherwise identical unreinforced web.

Example 9

A particle-loaded fibrillated PTFE web was prepared as in Example 7, with the exception that only a single layer of Naltex™ LWS filtration netting (0.38 mm thick) and a single PTFE web (0.50 mm thick) were layered and passed through a final two-roll mill so that the final thickness of the composite was 0.63 mm. A 47 mm diameter disk was cut from this web.

A dye test solution was prepared by combining 8 drops of blue food coloring and one liter of water, then mixing 5 ml of the dye solution with one liter of water. One liter of the test solution was pulled through the 47 mm disk, placed screen-side down in a 47 mm manifold vacuum system as described in Example 7. Dye breakthrough was observed along several of the net grid lines.

This example shows that screen-reinforced fibrillated PTFE webs can allow for channelling. Accordingly, scrim-reinforced webs are preferred where the web is to be used as a separation science medium.

Various modifications and alterations which do not depart from the scope and spirit of this invention will become apparent to those skilled in the art. This invention is not to be unduly limited to the illustrative embodiments set forth herein.

We claim:

1. A liquid permeable separation science medium for removing one or more solutes from a fluid comprising:

a) a porous liquid permeable fibrillated polytetrafluoroethylene web having particles entrapped therein, said particles being chemically reactive or sorptive toward said one or more solutes; and b) a liquid permeable non-woven scrim at least partially embedded in said web.

2. The separation science medium of claim 1 further comprising a second fibrillated polytetrafluoroethylene web.

3. The separation science medium of claim 1 further comprising a second scrim, said second scrim being separated from said first scrim by at least one fibrillated polytetrafluoroethylene web.

4. The separation science medium of claim 1 wherein said particles are activated carbon, silica, derivatized silica, intercalated styrene divinylbenzene, ion exchange resins, or chitin.

5. A method of making a porous, liquid permeable reinforced particle-loaded fibrillated polytetrafluoroethylene web article capable of removing one or more solutes from a fluid comprising the steps:

a) providing a porous, liquid permeable fibrillated polytetrafluoroethylene web having particles entrapped therein, said particles being chemically reactive or sorptive toward said one or more solutes; and b) pressure bonding to said web a liquid permeable scrim, said scrim being at least partially embedded in said web, said pressure bonding step leaving the porosity and liquid permeability of said web essentially unchanged.

\* \* \* \* \*

UNITED STATES PATENT AND TRADEMARK OFFICE
CERTIFICATE OF CORRECTION

PATENT NO.     : 6,207,251 B1                                                Page 1 of 1
DATED          : March 27, 2001
INVENTOR(S)    : Balsimo, William V.

It is certified that error appears in the above-identified patent and that said Letters Patent is hereby corrected as shown below:

Column 3,
Line 8, delete "Ser. No. 08/004,967" and insert in place thereof -- Pat. No. 5,354,603 --.
Line 22, delete "ppattern" and insert in place thereof -- pattern --.

Column 5,
Line 5, delete "funtion" and insert in place thereof -- function --.

Column 9,
Line 8, delete "Celestia$^{TM}$" and insert in place thereof -- Celestra$^{TM}$ --.

Signed and Sealed this

Twenty-ninth Day of October, 2002

Attest:

JAMES E. ROGAN
Attesting Officer          Director of the United States Patent and Trademark Office